Patented Dec. 23, 1947

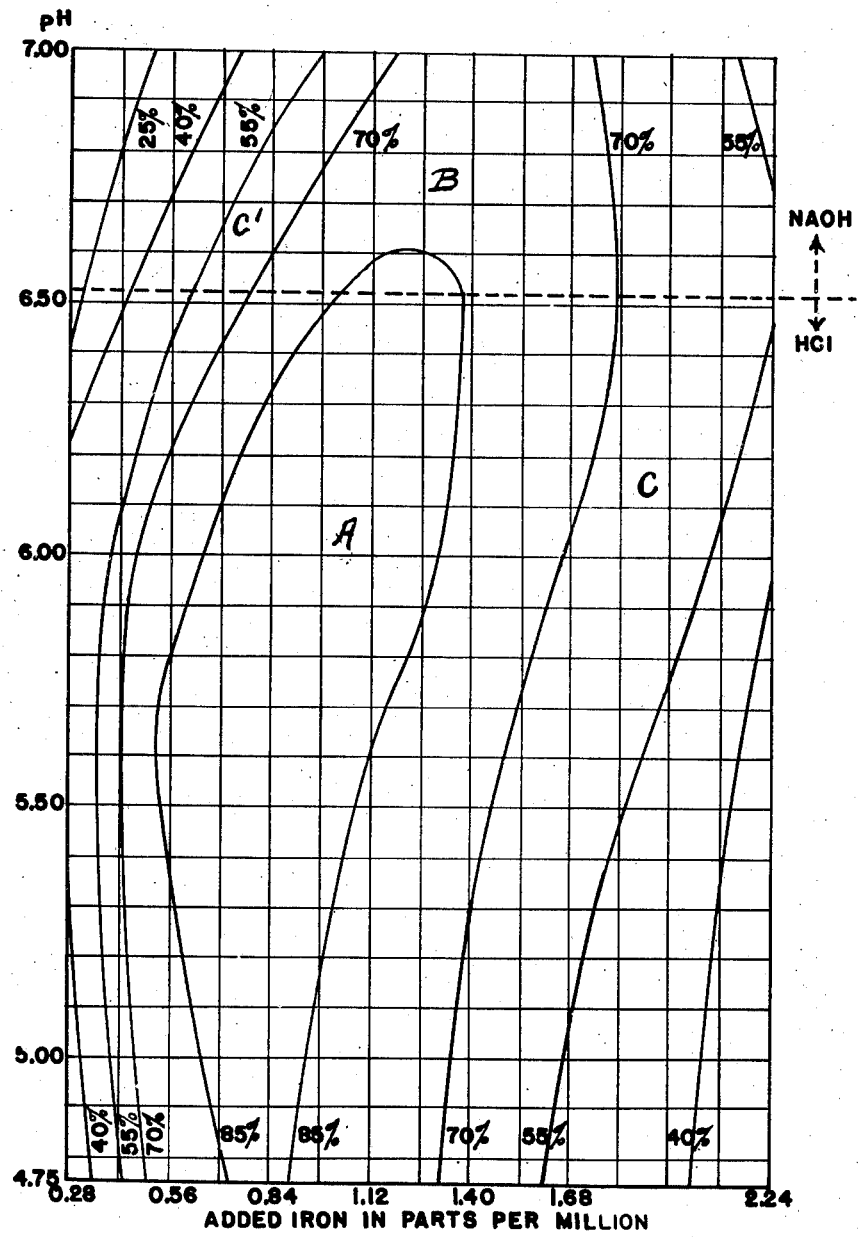

2,433,063

UNITED STATES PATENT OFFICE 2,433,063

METHOD OF CARRYING OUT FERMENTATION PROCESSES FOR PRODUCTION OF RIBOFLAVIN

Henry L. Pollard, Nelson E. Rodgers, and Reginald E. Meade, Appleton, Wis., assignors to Western Condensing Company, San Francisco, Calif., a corporation of California Application November 11, 1944, Serial No. 563,081

4 Claims. (Cl. 195—42)

This invention relates to processes for the manufacture of biologically active materials such as vitamins by fermentation processes. More particularly, the invention pertains to the synthesis, from lactose-containing products (in particular, lacteal material), of riboflavin and other vitamins by the action of bacteria, and, specifically, by the action of the bacterium Clostridium acetobutylicum.

The present application is a continuation-in-part of the application Serial No. 439,310, filed April 17, 1942, by Henry L. Pollard, Nelson E. Rodgers, and Reginald E. Meade, entitled "Process for manufacturing a vitamin concentrate" (now issued as United States Patent No. 2,369,680).

The following paragraphs describe generally a fermentation process to the improvement of which the present invention is particularly directed.

As disclosed in our copending application, we have found that the natural riboflavin content of whey or skim milk may be increased to a considerable extent by subjecting whey or skim milk under controlled conditions to the fermenting action of Clostridium acetobutylicum. Such a fermentation synthesis of riboflavin is accompanied by the formation of neutral solvents such as ethanol, acetone, and butanol, and gases such as hydrogen and carbon dioxide, which can be recovered as valuable by-products.

To prepare a lactose-containing lacteal medium such as whey or skim milk for fermentation to increase its riboflavin content, it is sterilized completely or substantially completely as by heat treatment at about 250° F. for about 10 to 20 minutes. In addition, the acidity of the lacteal medium is neutralized preferably to a pH of 6 to 7 by adding an alkaline reagent such as sodium, potassium or calcium hydroxide. Calcium carbonate may be added to enhance riboflavin production. The iron content of the lacteal medium is adjusted to the range of from 0.5 to less than 4.5 parts per million. In this connection it should be noted that the natural iron content of uncontaminated whey or skim milk will range from 0.10 to 0.21 part per million, while the iron content of whey contaminated, as by corrosive contact with iron containers, may reach a value above 4.5 parts per million. In the case of uncontaminated whey, the iron content may be adjusted upwardly by incorporation of suitable amounts of a soluble ferrous salt such as ferrous sulfate, while whey containing too much iron may be diluted with uncontaminated whey.

The thus prepared material, cooled to a temperature of about 100° F., is placed in a fermenting container and inoculated with Clostridium acetobutylicum (such as described by McCoy, Fred, Peterson and Hastings in "Journal of Infectious Diseases," volume 39, page 457), preferably at a temperature about 100° F. under conditions such as will prevent the introduction of iron and contaminating organisms. A suitable inoculum may be prepared from a stock culture by repeated transfers to a nutrient medium such as whey.

In general, fermentation of a batch of whey can continue for from twelve to forty-eight hours, or until there is no noticeable further increase in the riboflavin content.

The gases formed during fermentation can be vented from the fermenting tank as formed. The solvents formed during fermentation can be removed by fractional distillation, and after removing volatile products the fermented material can be concentrated by evaporation to produce a concentrated liquor. This liquor can be further subjected to drying to produce a powdered product.

If desired, instead of separately fractionating the solvents, they can be condensed from the vapors evolved during concentration of the fermented material by evaporation to form a water-solvent mixture from which the solvents can be removed by fractional distillation.

At some point after fermentation, it is desirable to inhibit further bacterial action, as for example by heat sterilization applied as a separate step or in conjunction with concentration by evaporation.

The product obtained by the above procedure is a concentrate which can be further refined or blended with various food material for human or animal consumption. By use of the process described hereinabove, the riboflavin content of whey has been increased from about 1.4 to from 6 to 70 micrograms per milliliter (before concentration), which corresponds to about 240 to 2800 micrograms per gram on a dried basis.

Some of the lactose is consumed in the fermenting process so that the final product contains a reduced amount of milk sugar, depending upon the extent of fermentation. The solids of the final product are the remaining solids of the whey or skim milk employed and therefore are available as food ingredients which are used to advantage when the product is blended with other material, such as various milk products, bread and bakery products, poultry and animal feeds, and the like.

An important feature of the invention described and claimed in our copending application relates to our discovery that, for good riboflavin yields, it is critically important to regulate the iron content of the whey or skim milk between the limits of 0.5 to less than 4.5 parts per million. If the iron content falls below the lower limit of 0.5 part per million, relatively little riboflavin is synthesized and the yield of neutral solvents is reduced.

For good yields of riboflavin, the iron content should be kept below 4.5 parts per million of iron. If the iron content exceeds 4.5 parts per million, relatively little riboflavin is synthesized, although good yields of neutral solvents may still be obtained.

We have now found that consistently good yields of riboflavin from lacteal or lactose-containing liquids are obtained by regulating not only the iron content but also prior to the sterilizing step regulating the pH as influenced by mineral acids and bases.

This influence of pH during the sterilization is distinct from and can be controlled apart from the pH prevailing during the fermentation. Such control improves the riboflavin yield over that obtained when the pH is regulated only during fermentation.

Further, we have discovered that a definite correlation exists between the optimal iron concentration and the optimal pH value prior to sterilization, so that, for consistently good yields of riboflavin, these two factors should not only fall between certain limits but should also be correlated.

It is therefore an important object of the present invention to provide a method for synthesizing biologically active material, such as riboflavin, from lacteal or lactose-containing liquids by fermentation in which the material is held within definite correlated limits of iron content and pH during sterilization.

Other and further features and objects of the present invention will become apparent from the following detailed description and appended claims.

In proceeding according to the present invention the directions given hereinabove as applying to the methods of the copending application are followed, except for the variations disclosed hereinbelow.

In adjusting the pH and iron content of the whey or other material being fermented, both variables are correlated to fall within one of the enclosed areas on the accompanying diagram.

This diagram is based on the results of several experiments and shows added iron content (over and above the normal iron content of uncontaminated whey) plotted in parts per million against pH before sterilization. The specified yield levels included within the various enclosed areas on the diagram represent the most frequent type of response to variation in pH and iron concentration, although the yields may deviate occasionally from the values indicated in the diagram. For best yields the added iron and pH should be regulated to fall within the limits indicated by the closed area A in the diagram. Good yields can be obtained by observing the limits indicated by the total area designated by the letters A, B, C and C', although within the areas B, C and C' the yields are not as good, or as consistently good, as within the area A.

It should be noted that the yield level will vary in different experiments. Thus, while certain combinations of added iron content and pH value prior to sterilization will effect the best yields of riboflavin from different batches of whey, yet such best yields may not be equal to all batches of whey.

The type of results obtained when proceeding according to the present invention are illustrated in the following experiments tabulated hereinbelow as Examples I and II (each carried out in duplicate) in which the influence of varied pH and concentrations on riboflavin synthesis have been tested.

The basal medium used in these experiments was rennet whey supplemented with 4.8 parts per million of zinc sulfate heptahydrate, 4.2 parts per million of manganous sulfate monohydrate, 10 parts per billion of para-aminobenzoic acid, 0.15% calcium carbonate and 0.15% tricalcium phosphate. Before sterilization, the basal medium was segregated into 100 milliliter volumes, ferrous sulfate was added to the segregated volumes in amounts indicated hereinbelow, and the pH values of the volumes were adjusted to the tabulated values with five normal hydrochloric acid or five normal sodium hydroxide. The variously supplemented media were then autoclaved, inoculated with 4% of a suitable *Clostridium acetobutylicum* culture and incubated at 100 F. for forty-eight hours. The riboflavin yields in duplicate cultures are shown in the following tables.

*Example I*

| pH before sterilization | pH after sterilization | Flavin μg./ml., added iron in parts per million | | | | |
|---|---|---|---|---|---|---|
| | | 0.56 | 0.84 | 1.12 | 1.40 | 1.68 |
| 7.0 | 6.58 | 16 | 31 | 42 | 59 | 49 |
| | | 16 | 22 | 51 | 58 | 58 |
| 6.8 | 6.40 | 27 | 36 | 53 | 62 | 55 |
| | | 24 | 35 | 54 | 65 | 55 |
| 6.6 | 6.23 | 20 | 32 | 65 | 63 | 55 |
| | | 21 | 44 | 62 | 58 | 56 |
| 6.5 | 6.20 | 31 | 54 | 64 | 70 | 61 |
| | | 29 | 53 | 66 | 68 | 59 |
| 6.4 | 6.11 | 31 | 58 | 62 | 64 | 52 |
| | | 35 | 54 | 65 | 62 | 57 |
| 6.3 | 6.09 | 46 | 64 | 60 | 56 | 54 |
| | | 48 | 70 | 68 | 62 | 49 |
| 6.2 | 6.00 | 45 | 67 | 60 | 55 | 25 |
| | | 43 | 62 | 67 | 53 | 52 |
| 6.1 | 6.08 | 57 | 69 | 64 | 56 | 58 |
| | | 54 | -- | 60 | 54 | 60 |
| 6.0 | 5.92 | 52 | 69 | 60 | 54 | 46 |
| | | 57 | 70 | 65 | 55 | 43 |
| 5.8 | 5.82 | 53 | 74 | 64 | 56 | 52 |
| | | 54 | 61 | 67 | 56 | 53 |
| 5.6 | 5.80 | 46 | 78 | 72 | 62 | 55 |
| | | 47 | 75 | 68 | 63 | 53 |
| 5.4 | 5.74 | 58 | 65 | 61 | 53 | 43 |
| | | 61 | 58 | 58 | 58 | 41 |
| 5.0 | 5.54 | 48 | 55 | 40 | 35 | 26 |
| | | 46 | 56 | 47 | 35 | 24 |

Example II

| pH before sterilization | pH after sterilization | Flavin μg./ml., added iron in parts per million | | | | | | |
|---|---|---|---|---|---|---|---|---|
| | | 0.28 | 0.56 | 0.84 | 1.12 | 1.40 | 1.68 | 2.24 |
| 7.00 | 6.80 | 7 | 17 | 28 | 46 | 50 | 42 | 33 |
| | | 6 | 18 | 29 | 32 | 45 | 45 | 32 |
| 6.60 | 6.40 | 10 | 32 | 50 | 53 | 49 | 46 | 36 |
| | | 9 | 32 | 47 | 54 | 50 | 48 | 33 |
| 6.40 | 6.40 | 12 | 44 | 50 | 56 | 55 | 44 | 38 |
| | | 11 | 49 | 51 | 54 | 52 | 45 | 34 |
| 6.20 | 6.20 | 30 | 46 | 56 | 52 | 52 | 43 | 25 |
| | | 29 | 51 | 56 | 54 | 54 | 38 | 28 |
| 6.10 | 6.00 | 33 | 50 | 64 | 57 | 55 | 48 | 31 |
| | | 22 | 51 | 58 | 56 | 60 | 49 | 31 |
| 6.00 | 5.90 | 27 | 48 | 56 | 55 | 52 | 42 | 23 |
| | | 30 | 49 | 61 | 53 | 57 | 42 | 21 |
| 5.75 | 5.81 | 36 | 60 | 65 | 51 | 46 | 38 | 24 |
| | | 31 | 58 | 64 | 53 | 42 | 39 | 21 |
| 5.50 | 5.83 | 26 | 62 | 64 | 55 | 47 | 38 | 23 |
| | | 30 | 54 | 60 | 52 | 45 | 37 | 19 |
| 5.27 | 5.81 | 31 | 33 | 60 | 48 | 43 | 40 | 25 |
| | | 19 | 48 | 59 | 49 | 43 | 39 | 24 |
| 5.00 | 5.72 | 15 | 35 | 56 | 46 | 47 | 32 | 20 |
| | | 19 | 48 | 58 | 52 | 45 | 39 | 18 |
| 4.76 | 5.51 | 21 | 50 | 58 | 47 | 44 | 32 | 22 |
| | | 19 | 49 | 58 | 48 | 41 | 37 | 19 |

It should be noted that results such as tabulated hereinabove are obtained when the pH is controlled by addition of mineral acid. Divergent results may be obtained if organic acids such as lactic acid are used to modify the pH value as described in our copending application, Serial No. 567,456.

It is emphasized that the pH control with which the present invention is concerned relates to the acidity conditions prevailing during sterilization, not to pH levels prevailing during fermentation. The distinction between the influence of pH during sterilization and during fermentation is illustrated by the following experiment.

The basal medium of this experiment was the same as that employed in the preceding experiments. Two aliquot parts of whey of initial pH 6.5 were adjusted to pH 7.0 and 5.0 with sodium hydroxide and hydrochloric acid, respectively. After setting up the series of media of varying iron content indicated in the accompanying table, the media were sterilized and cultured as in the preceding experiments. Another set of whey media were treated identically, except that immediately after sterilization the pH was adjusted by aseptic addition of hydrochloric acid or sodium hydroxide to approximately the same level as the post-sterilization pH of a similarly treated but unadjusted control (initial pH 6.5). The riboflavin yields obtained by these treatments are shown in the following table:

| pH before sterilization | pH after sterilization | | Flavin μg./ml., added iron in parts per million | | | | |
|---|---|---|---|---|---|---|---|
| | before adjustment | after adjustment | 0.56 | 0.84 | 1.12 | 1.40 | 1.68 |
| 6.5 (control) | 6.11 | | 19 | 57 | 49 | 54 | 37 |
| | | | 18 | 45 | 57 | 54 | 41 |
| 7.0 | 6.36 | | 14 | 25 | 30 | 60 | 50 |
| | | | 14 | 24 | 33 | 53 | 50 |
| 7.0 | 6.36 | 6.05 | 21 | 29 | 39 | 52 | 44 |
| | | | 19 | 26 | 38 | 50 | 44 |
| 5.0 | 5.42 | | 43 | 56 | 52 | 42 | 38 |
| | | | 43 | 62 | 50 | 13 | 36 |
| 5.0 | 5.42 | 6.05 | 46 | 57 | 55 | 41 | 40 |
| | | | 46 | 57 | 54 | 39 | 36 |

It will be noted that modifications in the response of riboflavin synthesis to different concentrations of iron were elicited by sterilization at high and low pH levels, regardless of whether or not the post-sterilization pH was adjusted to the same level as the post-sterilization pH of the control.

The above examples have been given solely as illustrations of the application of the methods of this invention to the synthesis of riboflavin from lacteal or lactose-containing liquids. A number of experiments of this general type form the basis for the claimed combinations of optimal iron concentrations and pH values. Single experiments may show minor deviations from the claimed ranges, but in a series of experiments consistently good average yields of riboflavin may be obtained by maintaining the claimed pH values and iron concentrations.

In the foregoing, particular reference has been made to synthesis of riboflavin. It is to be understood, however, that other nutritive or vitamin factors or factors of B complex may be synthesized in addition to riboflavin. Further, for obtaining a good yield of neutral solvents, only the lower limits of iron concentration need to be observed.

Many details of composition and procedure may be varied within a wide range without departing from the principles of this invention, and it is therefore not our purpose to limit the scope of the patent granted on this invention otherwise than necessitated by the scope of the appended claims.

We claim as our invention:

1. In a process for manufacturing a vitamin concentrate comprising the steps of synthesizing riboflavin by first sterilizing and then fermenting with *Clostridium acetobutylicum* a lacteal material selected from the group consisting of skim milk and whey, the improvement comprising providing said material with an iron content in excess of the 0.10 to 0.21 parts per million natural iron content of said material and incorporating with said material a mineral reagent capable of modifying the pH of said material, said excess being maintained at such a value and said incorporation being so adjusted that the excess iron content of said material and the pH of said material will fall within the enclosed area A on the accompanying diagram.

2. In a process for manufacturing a vitamin concentrate comprising the steps of synthesizing riboflavin by first sterilizing and then fermenting with *Clostridium acetobutylicum* a lacteal material selected from the group consisting of skim milk and whey, the improvement comprising providing said material with an iron content in excess of the 0.10 to 0.21 parts per million natural iron content of said material and incorporating with said material an added mineral reagent capable of modifying the pH of said material, said excess being maintained at such a value and said incorporation being so adjusted that the excess iron content of said material and the pH of said material will form somewhere within the enclosed areas A, B, C and C' on the accompanying diagram.

3. In a process for manufacturing a vitamin concentrate comprising the steps of synthesizing riboflavin by first sterilizing and then fermenting whey with *Clostridium acetobutylicum*, the improvement comprising providing whey containing iron in excess of the 0.10 to 0.21 parts per million natural iron content of whey and incorporating with said whey a mineral reagent capable of modifying the pH of said whey, said excess being maintained at such a value and said incorporation being so adjusted that the excess iron content of said whey and the pH of said whey will fall within the enclosed area A on the accompanying diagram.

4. In a process of manufacturing a vitamin concentrate comprising the steps of synthesizing riboflavin by first sterilizing and then fermenting whey with *Clostridium acetobutylicum*, the improvement comprising providing whey containing iron in excess of the 0.10 to 0.21 parts per million natural iron content of whey and incorporating with said whey a mineral reagent capable of modifying the pH of said whey, said excess being maintained at such a value and said incorporation being so adjusted that the excess iron content of said whey and the pH of said whey will fall somewhere within the enclosed areas A, B, C and C' on the accompanying diagram.

HENRY L. POLLARD.
NELSON E. RODGERS.
REGINALD E. MEADE.

REFERENCES CITED

The following references are of record in the file of this patent:

UNITED STATES PATENTS

| Number | Name | Date |
| --- | --- | --- |
| 2,128,843 | Myers | Aug. 30, 1938 |
| 2,387,023 | Hines | Oct. 16, 1945 |
| 2,369,680 | Meade et al. | Feb. 20, 1945 |
| 2,089,522 | Woodruff | Aug. 10, 1937 |
| 2,326,425 | Arzberger | Aug. 10, 1943 |